United States Patent
Drory et al.

(10) Patent No.: US 7,265,760 B2
(45) Date of Patent: Sep. 4, 2007

(54) METHOD AND SYSTEM FOR DEFINING BORDER TILE ATTRIBUTES FOR POLYGONS

(75) Inventors: Tal Drory, Haifa (IL); Eyal Sonsino, Nesher (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 10/809,261

(22) Filed: Mar. 25, 2004

(65) Prior Publication Data

US 2005/0212810 A1 Sep. 29, 2005

(51) Int. Cl.
*G09G 5/00* (2006.01)
(52) U.S. Cl. .................. 345/581; 345/423; 345/428; 345/694
(58) Field of Classification Search ............... 345/694, 345/581, 423, 428, 149; 382/195, 197, 201–204; 707/2, 3, 10, 101, 102; 706/11
See application file for complete search history.

(56) References Cited

U.S. PATENT DOCUMENTS

| 5,220,647 | A | 6/1993 | Kumagai |
| 5,852,446 | A | 12/1998 | Hashimoto et al. |
| 6,701,306 | B1 * | 3/2004 | Kronmiller et al. ............ 707/2 |
| 6,873,343 | B2 * | 3/2005 | Chui ......................... 345/667 |
| 2002/0093520 | A1 * | 7/2002 | Larson ....................... 345/694 |
| 2002/0118202 | A1 * | 8/2002 | Baldwin ..................... 345/530 |

FOREIGN PATENT DOCUMENTS

JP 410240952 A * 9/1998

* cited by examiner

*Primary Examiner*—Mark Zimmerman
*Assistant Examiner*—Jwalant Amin

(57) ABSTRACT

A method and system for defining border tile attributes for polygons. In one embodiment, a method for defining attributes of polygon border tiles comprises: decomposing a polygon into a plurality of segments; decomposing the segments into a plurality of border tiles; designating at least one edge for each border tile; determining a spatial relationship between the designated edge of each border tile and the polygon; and generating the attributes of the border tiles based on the spatial relationship between the designated edge of each border tile and the polygon.

20 Claims, 6 Drawing Sheets

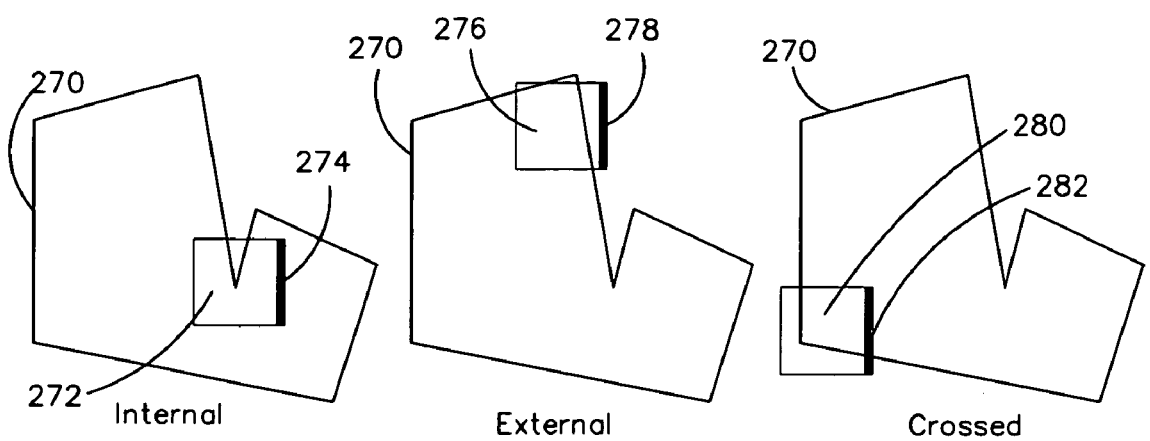
Fig.4A Internal
Fig.4B External
Fig.4C Crossed
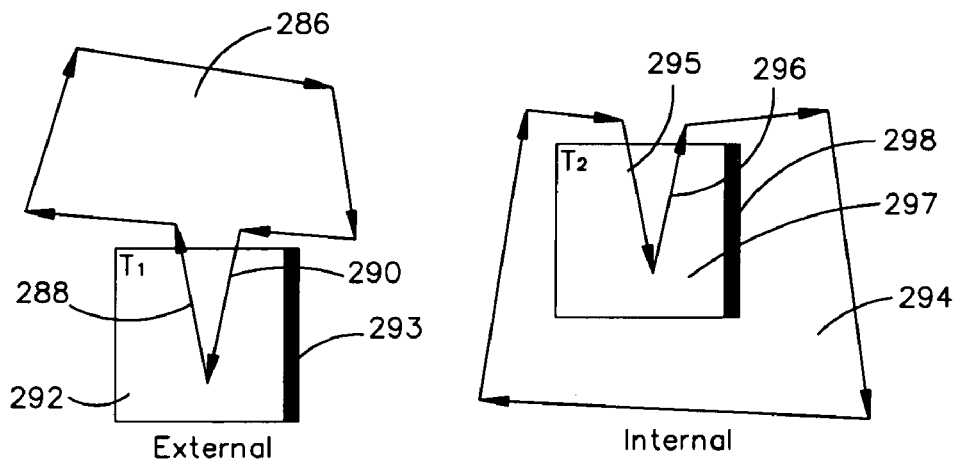
Fig.5A External
Fig.5B Internal
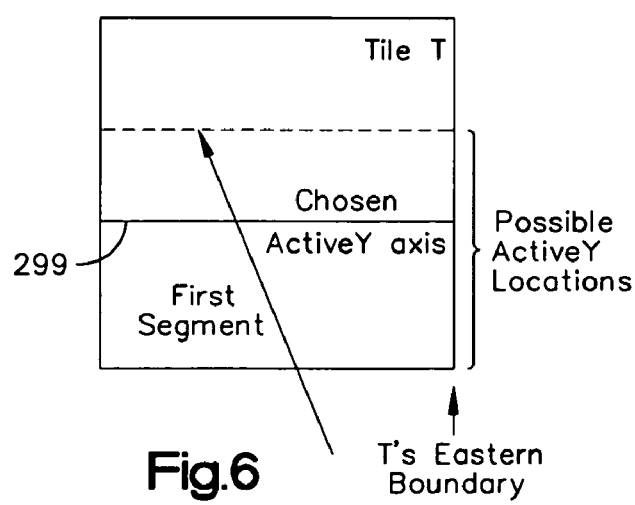
Fig.6

METHOD AND SYSTEM FOR DEFINING BORDER TILE ATTRIBUTES FOR POLYGONS

BACKGROUND

Many applications analyze and utilize multidimensional data, such as spatial data. Spatial data generally describes characteristics (e.g., location, size, shape, etc.) of geometric objects, such as points, lines, polygons, regions, surfaces, volumes, etc. Spatial data is used in many fields, such as computer-aided design, computer graphics, data management systems, robotics, image processing, geographic systems, pattern recognition, and computational geometry, just to name a few examples.

Spatial data can be stored in a spatial database. A spatial index is created in the database in order to facilitate efficient query execution. Different types of spatial indexes are known and examples of indexes include Grid, R-tree, and QuadTree.

In the process of building a spatial index for spatial objects, and sometimes in spatial query processing, the execution of spatial decomposition is needed. In spatial decomposition, the space is tessellated into a grid of tiles, and each spatial object is decomposed to the list of tiles it intersects. In image processing algorithms, the pixel is the basic unit of tessellated space, while in spatial decomposition the space is tessellated into a grid of tiles that can vary in their size.

Generally, the decomposition of points and line-strings is known and relatively straightforward. The decomposition of polygons, however, is more complicated and generally includes two processes: detecting the polygon border tiles, and then detecting the polygon interior tiles. This latter process can be complex.

Several algorithms exist for detecting the polygon interior tiles or filling or coloring the interior of the polygon. For example, the flood-fill algorithm starts with a point inside the polygon and recursively propagates color to neighboring pixels until either a border pixel or already colored pixel is reached. As another example, the scan conversion algorithm uses a horizontal scan line that advances through the polygon to detect intersecting points of the scan line with the polygon.

Prior polygon fill algorithms are not well suited for spatial decomposition of non-self-intersecting polygons. The flood-fill algorithm can fail to fill all interior pixels, for example, if a single pixel is crossed by more than one polygon edge. By contrast, the scan conversion algorithm can involve presorting the polygon edges and can be quite complex and time-consuming to implement.

SUMMARY

Embodiments in accordance with the present invention are directed to a method and system for defining border tile attributes for polygons. In one embodiment, a method for defining attributes of polygon border tiles comprises: decomposing a polygon into a plurality of segments; decomposing the segments into a plurality of border tiles; designating at least one edge for each border tile; determining a spatial relationship between the designated edge of each border tile and the polygon; and generating the attributes of the border tiles based on the spatial relationship between the designated edge of each border tile and the polygon.

In another embodiment in accordance with the present invention, a computer-readable medium has computer-readable program code embodied therein for causing a computer system to perform: defining a polygon having a border that is non-self-intersecting and formed of a plurality of segments on a grid of tiles; defining, from the grid of tiles, a plurality of border tiles that intersect the segments; and generating an attribute associated with at least one edge of a border tile, wherein the attribute is selected from the group consisting of: the at least one edge crossing a segment, the at least one edge disposed completely within the polygon, and the at least one edge disposed completely outside the polygon.

Other embodiments and variations of these embodiments are shown and taught in the accompanying drawings and detailed description.

BRIEF DESCRIPTION OF THE DRAWINGS

FIG. 4A is a polygon with a tile having an eastern edge that is "internal."

FIG. 4B is a polygon with a tile having an eastern edge that is "external."

FIG. 4C is a polygon with a tile having an eastern edge that is "crossed."

FIG. 5A is a polygon with a tile having an eastern edge that is "external."

FIG. 5B is a polygon with a tile having an eastern edge that is "internal."

FIG. 6 illustrates a border tile T with a First Segment passing through an Active Y horizontal axis.

DETAILED DESCRIPTION

Figure 1:
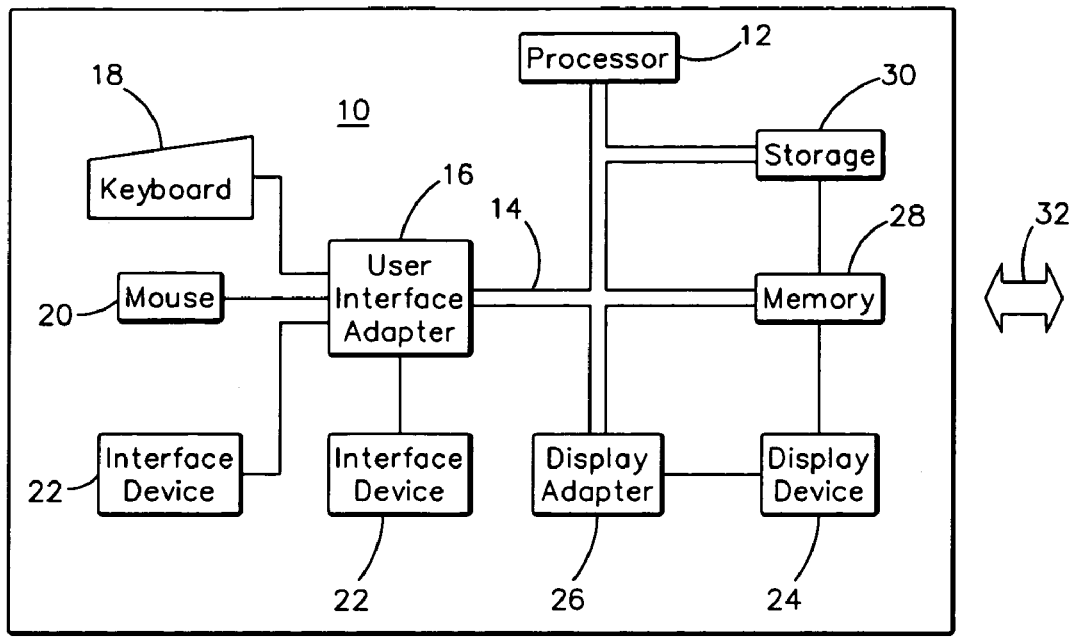
FIG. 1 is a block diagram of a computer in accordance with the present invention.

Embodiments in accordance with the present invention are generally directed to methods, systems, and apparatus for defining border tile attributes for polygons. Such embodiments relate to or can be utilized with spatial decomposition of objects, such as polygons.

Space can be tessellated into a grid of tiles, and each spatial object can be decomposed to a list of tiles that the object intersects. Spatial polygons, for example, can be defined by a set of discrete segments joined together. These segments can be converted to a non-self-intersecting chain-code representation.

For purposes of illustration, configuration of pixels in an image may be represented as a series of vectors. Each vector represents a unit displacement in a predetermined direction and is referred to as a chain element. A series of vectors is called an "indexed sequence" or "chain-code." The coordinates of each connected point are called chain coordinates. The process of expressing an image as a series of vectors is generally called "chain coding." Chain-code can be further defined as a sequence of unit vectors that pass on the grid lines of the grid. The vectors can pass on the grid lines in one of the following directions: north, south, east, or west. A closed sequence of chain-code is used to define an area defined by the polygon. If the direction of the chain-code around the area is assumed to be clockwise, then the tiles to the right of the chain-code vectors are considered part of the area. Of course, the direction of the chain-code can be counterclockwise; here, the tiles to the left of the chain-code are considered part of the area.

In embodiments in accordance with the present invention, a polygon can be converted to non-self-intersecting chain-code representation. The chain-code representation is applicable even if the polygon segments pass through a single tile in various or multiple directions. In other words, multiple segments, for example, can pass through the same tile more than once. Embodiments in accordance with the present invention can thus convert a spatial representation of a polygon to a non-self-intersecting chain-code representation even if the segments of the polygon pass through or touch a single tile in various locations or directions.

Embodiments in accordance with the present invention can be utilized to generate the interior tiles of a polygon given a closed sequence of chain-code. Generally, the border tiles are identified and notated with specific information or attributes (described hereinafter). Once the border tiles are identified and notated, various systems, methods, apparatus, and/or algorithms can be used to identify, acquire, or fill the interior tiles of the polygon.

For purposes of this disclosure, the term "polygon" should be broadly construed. The term, for example, can mean a closed plane figure bounded by straight lines or a closed figure on a sphere bounded by arcs of great circles. Further, the term "attribute" should be broadly construed. The term, for example, can mean a characteristic (such as an inherent characteristic), an ascribing quality, a tribute, and/or information.

FIG. 1 illustrates a representative computer hardware environment in which an embodiment in accordance with the present invention may be practiced. The environment of FIG. 1 comprises a representative single user computer 10, such as a personal computer, including related peripheral devices. The computer 10 includes a processor or microprocessor 12 and a bus 14 used to connect and enable communication between the microprocessor 12 and the components of the computer 10. The computer 10 typically includes a user interface adapter 16 that connects the microprocessor 12 via the bus 14 to one or more interface devices, such as a keyboard 18, mouse 20, and/or other interface devices 22. The interface adapter 16 can be any user interface device, such as a touch sensitive screen, digitized entry pad, or any one of other embodiments. The bus 14 also connects a display device 24, such as an LCD screen or monitor, to the microprocessor 12 via a display adapter 26. The bus 14 also connects the microprocessor 12 to memory 28 and long-term storage 30 that can include a hard drive, diskette drive, tape drive, etc.

The computer 10 may communicate with other computers or networks of computers, for example, via a communications channel or modem 32. Alternatively, the computer 10 may communicate using a wireless interface at 32. The computer 10 may be associated with such other computers in a local area network (LAN) or a wide area network (WAN), or the computer 10 can be a client in a client/server arrangement with another computer, etc. All of these configurations, as well as the appropriate communications hardware and software, are known in the art.

For convenience of illustration, a single user computer 10 is illustrated. Embodiments in accordance with the present invention are not limited to the computer 10 of FIG. 1. Various portable and non-portable computers and/or electronic devices also may be utilized. By way of example, embodiments in accordance with the present invention include, but are not limited to, servers, computers (portable and non-portable), laptops, notebooks, personal digital assistants (PDAs), tablet PCs, handheld and palm top electronic devices, compact disc players, portable digital video disk players, radios, cellular communication devices (such as cellular telephones), and other electronic devices and systems whether such devices and systems are portable or non-portable.

In the various embodiments in accordance with the present invention, embodiments are implemented as one or more computer software programs. The software may be implemented as one or more modules (also referred to as code subroutines, or "objects" in object-oriented programming). The location of the software (whether on the client computer or elsewhere) will differ for the various alternative embodiments. The software programming code, for example, can be accessed by the microprocessor 12 of the computer 10 and/or a server from long-term storage media of some type, such as a CD-ROM drive or hard drive. The software programming code may be embodied or stored on any of a variety of known media for use with a data processing system or in any memory device such as semiconductor, magnetic and optical devices, including a disk, hard drive, CD-ROM, ROM, etc. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

Some embodiments in accordance with the present invention can be described in connection with the flow diagram of FIG. 2 and the following algorithm:

---

1. All Border Tiles ←∅
2. For each segment S of the polygon:
   - Decompose S into a set B of border tiles
   - For every tile T ∈ B:
     - if T ∈All Border Tiles
       Initialize(T,S)
       All Border Tiles ← All Border Tiles ∪ {T}
     else
       Modify Tile Attributes (T,S)

For purposes of discussion, a polygon with a plurality of segments is utilized. The polygon has non-self-intersecting segments and forms a closed loop. Further, the polygon is described with vertices occurring in a clockwise order; as such, the interior of the polygon is always to the right of each segment while maneuvering around the polygon in the clockwise direction.

In general terms, the polygon, defined by a plurality of segments, is converted to a plurality of notated border tiles. The notated border tiles have a single attribute or a plurality of attributes that define the tile with respect to a segment, segments, the interior of the polygon, and/or the exterior of the polygon, to name a few examples. Once the polygon is converted to notated border tiles, a spatial polygon decomposition algorithm can be utilized or otherwise employed that is based on the generation of the notated border tiles. Further, additional algorithms can then be used, for example, to identify or fill the interior of the polygon.

Figure 2:
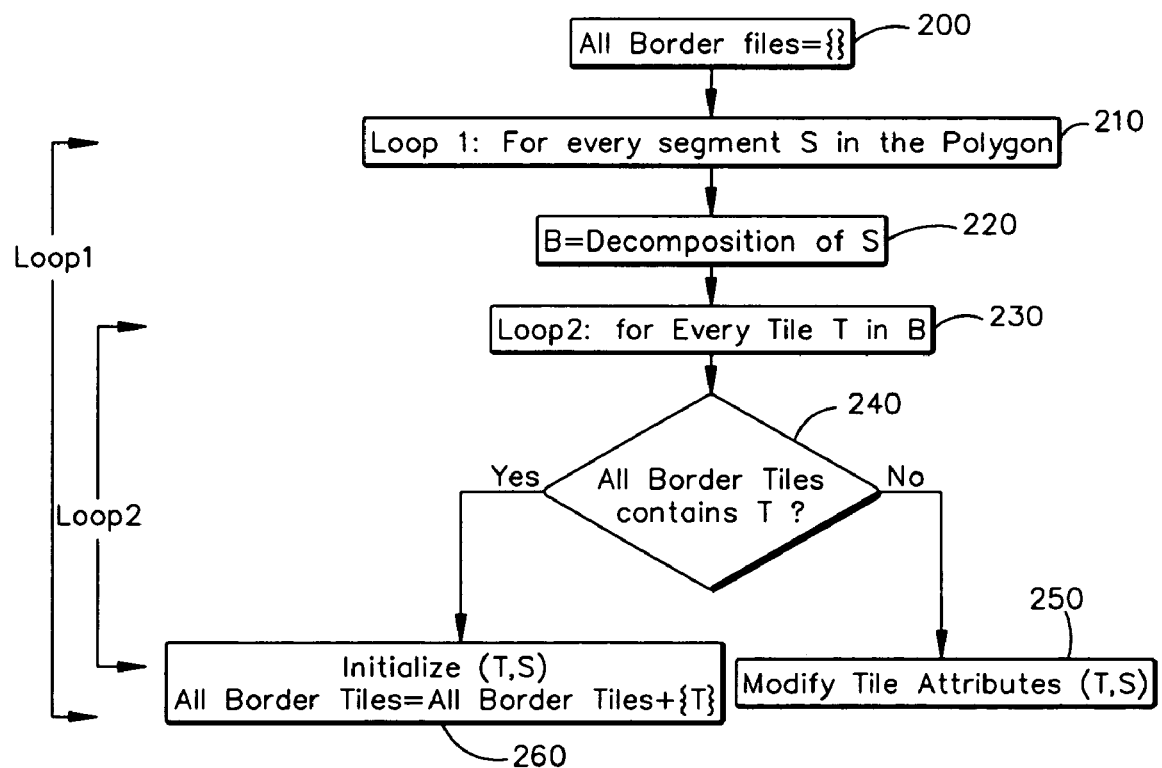
FIG. 2 is a flow diagram of embodiments in accordance with the invention.

Turning now to FIG. 2, per block 200, the polygon is decomposed or defined into respective segments. Per block 210, Loop 1 is performed and repeated for every segment, S, in the polygon. Per block 220, each segment is decomposed or defined into a set B of border tiles. Per block 230, Loop 2 is performed and repeated for every tile T in the set B of border tiles. In block 240, a question is asked: All Border Tiles contain T? If the response is "no," then per block 250 Modify Tile Attributes (T, S). If, on the other hand, the response is "yes," then per block 260 Initialize (T, S).

Some embodiments in accordance with the present invention are further described in connection with FIG. 3, FIGS. 4A-4C, FIGS. 5A and 5B, FIG. 6, and the following algorithm:

The status of the tile's edge is further determined by the direction of the polygon segment that is the closest to that tile's edge. This situation can occur, for example, when two segments pass through the same tile. In FIG. 5A, a polygon 286 has two segments 288 and 290 passing through a single tile 292. In this figure, the segment 290 is closest to the eastern edge 293. The direction of the closest segment 290 to the tile's eastern edge 293 is downward, and the algorithm sets the attribute of the tile's eastern edge to be external. In FIG. 5B, a polygon 294 has two segments 295 and 296 passing through a single tile 297. In this figure, the segment 296 is closest to the eastern edge 298. Since the eastern edge 298 is upward, the algorithm sets the attribute of the tile's eastern edge to be internal.

Each border tile of the polygon can have a single attribute or a plurality of different and/or distinct attributes. These attributes can be defined in a variety of ways. For example, each border tile can have three attributes of: Status, Active Segment, and Active Y.

The Status attribute is defined as the current status of the eastern edge of the tile. The Status can be selected from one of Crossed, External, Internal, Initialized, or Undefined. The attributes of Crossed, External, and Internal are discussed in connection with FIGS. 4A-4C and FIGS. 5A-5B.

The attributes for the tiles are maintained for each border tile generated by the decomposition of the polygon. In the process of the algorithm, tile attributes can be modified. For example, every time a segment passes through a tile, the tile will be "discovered" again or re-evaluated, re-assessed, or re-calculated. Hence, at the end of the algorithm, the status of the eastern edge of the tile will be set to the correct and final value: external, internal, or crossed.

```
Initialize(T: Tile, S: Segment)
        T.activeSegment ← S
        If S crosses the eastern edge of T
                - T.status ← CROSSED
        Else
                - T.activeY ← choose an arbitrary active y which crosses S and T
                - set T.status according to S's direction as follows:
                        - if S is in upward direction, T.status ← INTERNAL
                        - if S is in downward direction, T.status ← EXTERNAL
                        - else, S is horizontal, T.status ← Undefined
```

The general idea of the algorithm is to notate each of the polygon border tiles with the status of its edges. The status indicates the spatial relationship between the eastern edge of the tile and the segment or segments in or on the tile. For purposes of illustration, the status is given with respect to the eastern edge of the tile. Of course, additional edges (alone or in combination with each other) could be used. Such edges include the northern edge, the southern edge, and the western edge.

Generally, the status indicates one of three different relationships or attributes for every eastern tile edge. These three relationships are shown in FIGS. 4A-4C. FIG. 4A shows a polygon 270 with a tile 272 having an eastern edge 274. Since the eastern edge 274 is completely inside of the polygon 270, the tile status for the eastern edge is designed "internal." FIG. 4B shows the polygon 270 with a tile 276 having an eastern edge 278. Since the eastern edge 278 is completely outside of the polygon 270, the tile status for the eastern edge is designed "external." FIG. 4C shows the polygon 270 with a tile 280 having an eastern edge 282. Since the eastern edge 282 is crossed by the border of the polygon 270, the tile status for the eastern edge is designed "crossed."

The status of the border tile can be translated to a "chain-code border code." Such border code can be used by chain-code based polygon decomposition algorithms. For example, the "internal" status or "crossed" status can specify that the border tile does not touch the chain-code boundary. By contrast, the "external" status can specify that the border tile does touch the chain-code boundary.

Figure 3:
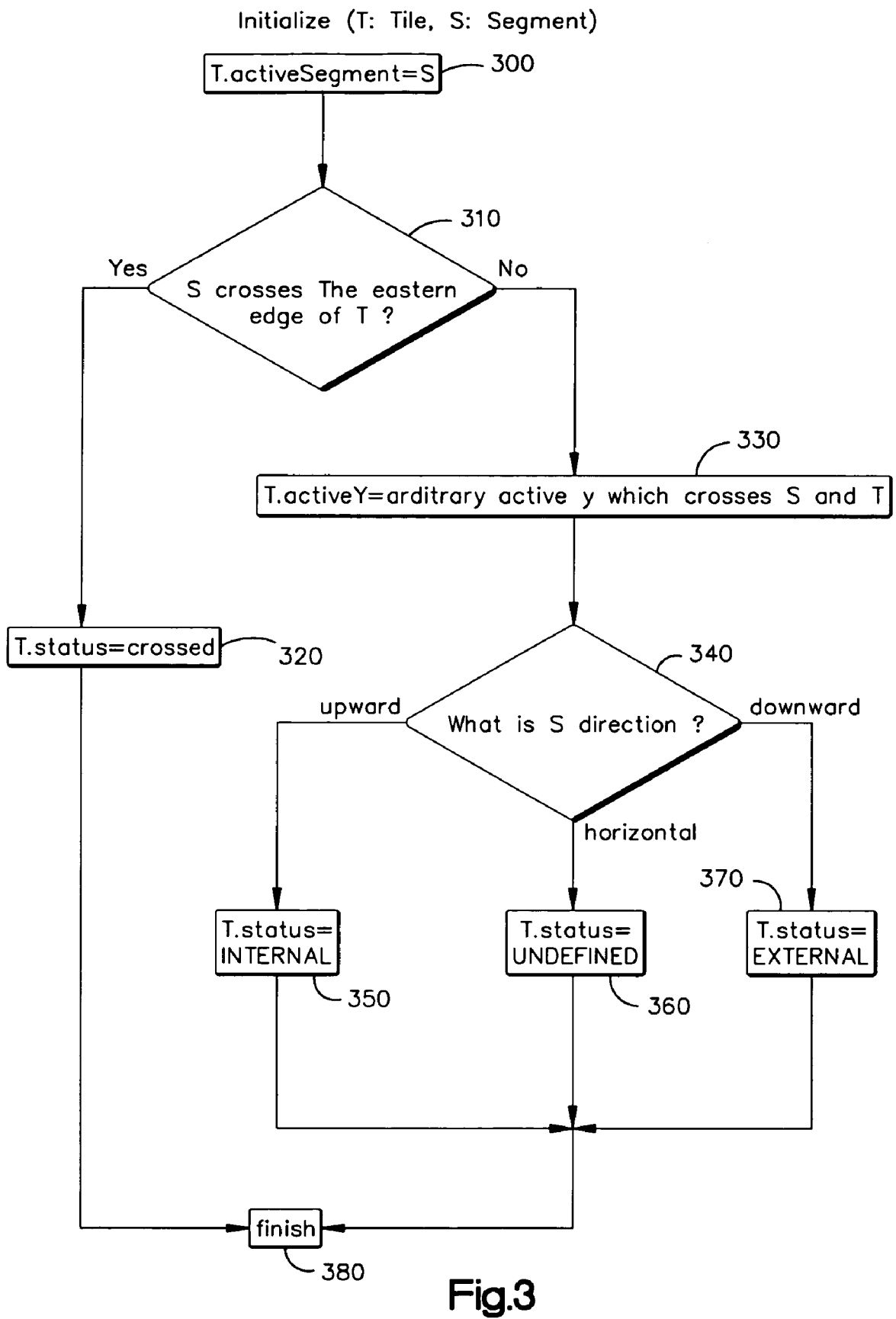
FIG. 3 is a flow diagram of embodiments in accordance with the invention.

Turning now to FIG. 3, per block 300, tile T is the Active Segment from S. The Active Segment attribute is defined as the segment that, until the current time, determines the status of the eastern edge. The Active Segment is initialized to none.

At block 310, a question is asked: Does the segment S cross the eastern edge or eastern border of tile T? If the answer is "yes," then per block 320 the status of tile T is defined as "crossed." If the answer is "no," then per block 330 tile T Active Y is equal to arbitrary Active Y that crosses segment S and tile T. The Active Y attribute is used to determine which of multiple segments passing through the tile is the active segment.

Looking to FIG. 6, a horizontal line 299 (Active Y horizontal axis) is defined inside the tile T. Once the line is defined, only segments that cross the line are considered.

This line 299 is the "Active Y" attribute of the tile T. The "Active Y" is initialized to none, and set only once to be an arbitrary horizontal line that crosses the first segment that passes through the tile T.

Per block 340, a question is asked: What is the direction of segment S? As noted, the direction of the segment S is discussed in connection with FIGS. 4A-4C and FIGS. 5A and 5B. If the direction of the segment S is upward, then per block 350 the tile T status is set to "internal." If the direction of the segment S is horizontal, then per block 360 the tile T status is set to "undefined." If the direction of the segment S is downward, then per block 370 the tile T status is set to "external."

Once the status of tile T is set (i.e., to one of crossed, internal, undefined, or external), the flow diagram finishes per block 380.

Some embodiments in accordance with the present invention are further described in connection with FIG. 7, FIGS. 8A-8D, and the following algorithm:

```
Modify Tile Attributes (T: Tile, S: Segment)
If T.status == CROSSED
    - return
If S crosses the eastern edge of T
    - T.status ← CROSSED
    - return
If S is horizontal
    - return
If S doesn't cross activeY
    - return
If IsEasternThan(S, T.activeSegment, T.activeY)
    - T.activeSegment ← S
    - set T.status according to S's direction as follows:
        - if S is in upward direction, T.status ← INTERNAL
        - if S is in downward direction, T.status ← EXTERNAL
```

Figure 8A:
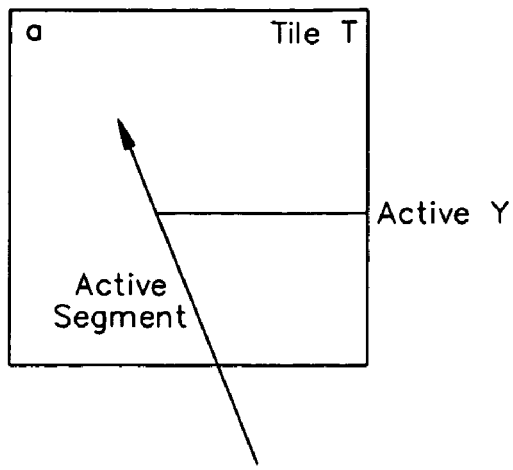
FIG. 8A is a tile T with an Active Segment intersecting an Active Y horizontal line.
Figure 8B:
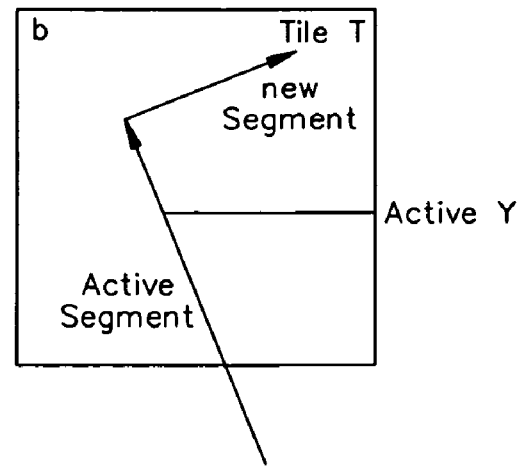
FIG. 8B is the tile T of FIG. 8A with a New Segment that does not cross the Active Y horizontal line (the status remaining unmodified).
Figure 8C:
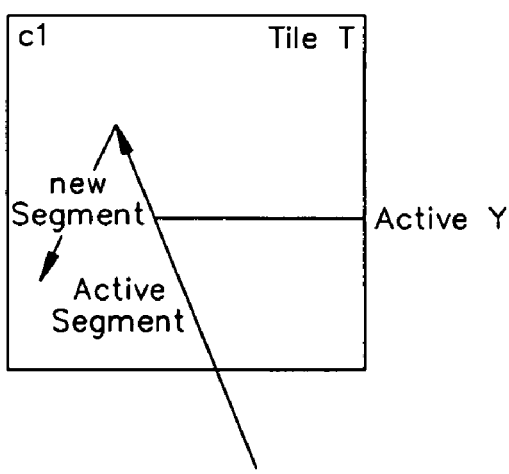
FIG. 8C is the tile T of FIG. 8A with a New Segment that does cross the Active Y horizontal line but is not more eastern than the Active Segment (the status remaining unmodified).
Figure 8D:
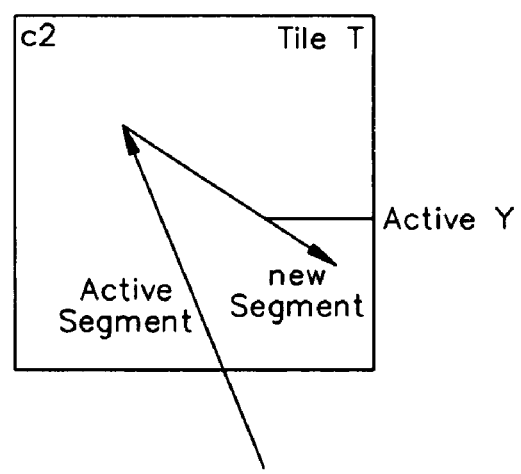
FIG. 8D is the tile T of FIG. 8A with a New Segment that does cross the Active Y horizontal line and is more eastern than the Active Segment (the status being modified).

FIGS. 8A-8D illustrate the Modify Tile Attributes algorithm. In FIG. 8A, a tile T is initialized with an Active Segment and an Active Y. When a New Segment is added, the tile T should modify or adjust its attributes or verify if such a modification or adjustment is necessary. In FIG. 8B, for example, the New Segment does not cross the Active Y horizontal axis. Therefore, the attributes of tile T will not be modified. However, in a scenario when the New Segment does cross the Active Y horizontal line, a comparison is made between the Active Segment and the New Segment to decide which segment crosses Active Y nearest to the eastern tile edge. For example, in FIG. 8C, the New Segment is not closer than the Active Segment to the eastern tile edge. Hence, in this scenario, the attributes of tile T will not be modified. FIG. 8D illustrates another example. Here, the New Segment is closer than the Active Segment to the eastern tile edge. Hence, in this scenario, the attributes of tile T will be modified. In particular, the Active Segment will be set to S and the status of the tile T will be changed from "internal" to "external." In FIG. 8D, the status is "external" since the direction of the segment is downward.

Figure 7:
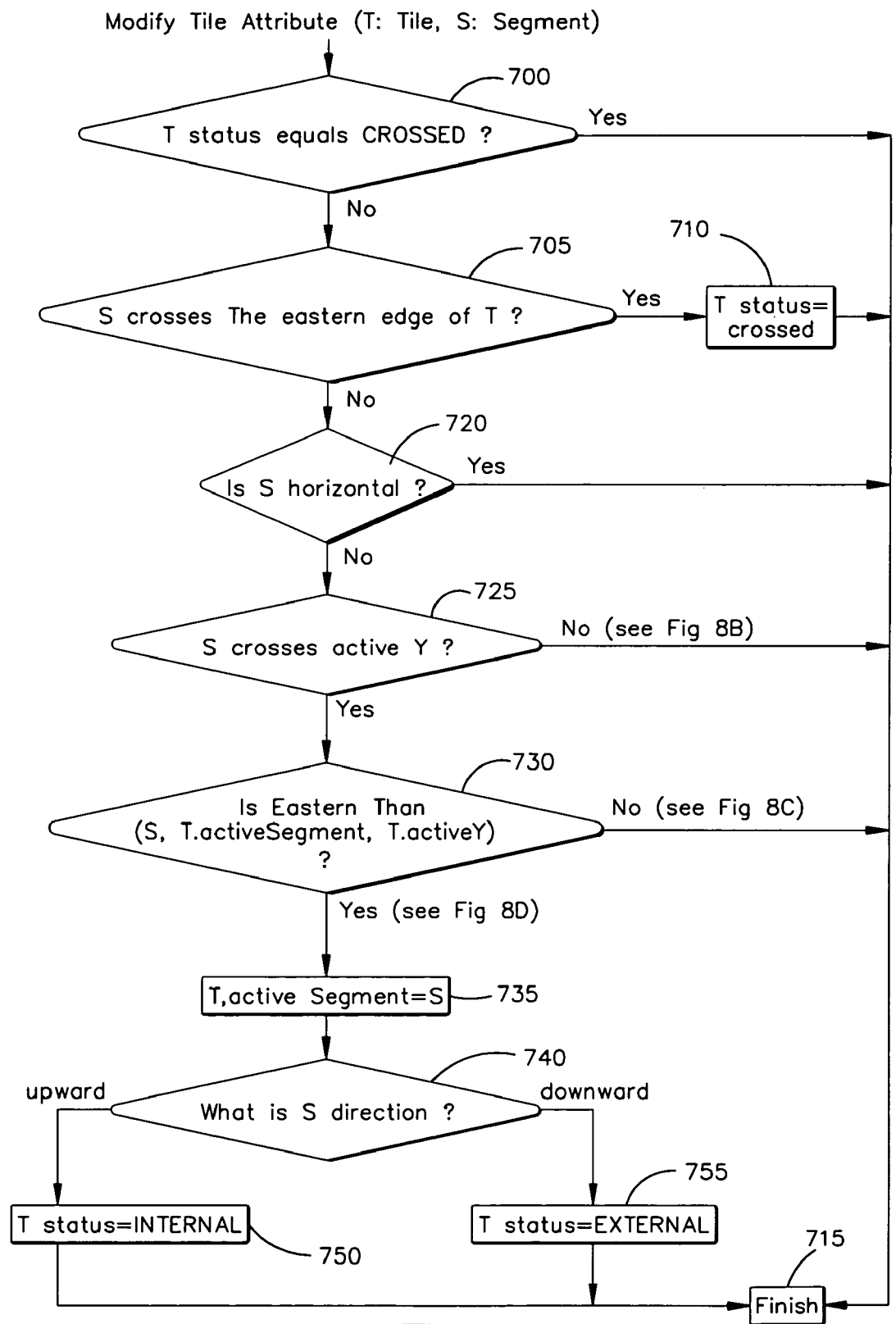
FIG. 7 is a flow diagram of embodiments in accordance with the invention.

Turning now to the flow diagram of FIG. 7, per block 700, the question is asked: Does the status of tile T equal "crossed?" If the answer is "yes," then per block 715 the flow diagram is finished. If the answer is "no," then per block 705, the question is asked: Does segment S cross the eastern edge of tile T? If the answer is "yes," then per block 710 the status of tile T is set to "crossed." If the answer is "no," then per block 720 the question is asked: Is segment S horizontal? If the answer is "yes," then per block 715 the flow diagram is finished. If the answer is "no," then per block 725, the question is asked: Does segment S cross Active Y? If the answer is "no," then per block 715 the flow diagram is finished. This scenario occurs, for example, in the embodiment shown and described in connection with FIG. 8B. If the answer to the question in block 725 is "yes," then per block 730 the question is asked: Is the New Segment more eastern than the Active Segment? If the answer is "no," then per block 715 the flow diagram is finished. This scenario occurs, for example, in the embodiment shown and described in connection with FIG. 8C. If the answer to the question in block 730 is "yes," then per block 735 segment S is equal to the Active Segment. This scenario occurs, for example, in the embodiment shown and described in connection with FIG. 8D. Next, per block 740, a question is asked: What is the direction of segment S? If the direction is upward, then per block 750, the status of tile T is set to "internal." If, on the other hand, the direction is downward, then per block 755, the status of tile T is set to "external." The flow diagrams then finish per block 715.

Some embodiments in accordance with the present invention are further described in connection with FIG. 9, FIGS. 10A and 10B, and the following algorithm:

```
Is Eastern Than (S₁: Segment, S₂: Segment,
        activeY: horizontal line)
    x₁ ← the x ordinate of the intersection point between S₁ and activeY
    x₂ ← the x ordinate of the intersection point between S₂ and activeY
    if x₁ > x₂ return TRUE (x₁ is more to the east than X₂)
    if x₂ > x₁ return FALSE
    x1==x2, (as in Figure 10):
    let activeY' be a horizontal line, different from activeY,
        which crosses at least one of the segments
    return IsEasternThan(S₁, S₂, activeY')
```

Figures 10A, 10B:
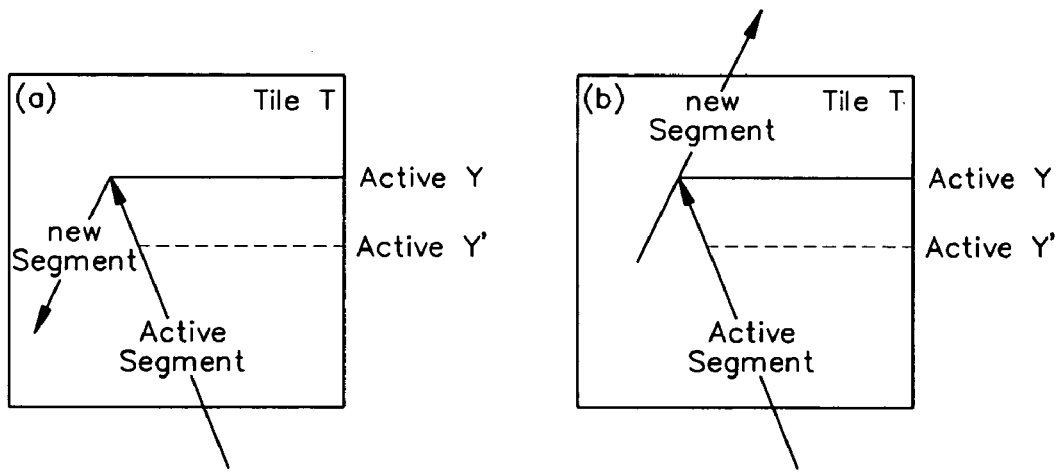
FIG. 10A is a tile T with a first scenario wherein two segments (New Segment and Active Segment) intersect the Active Y at the same point.
FIG. 10B is a tile T with a second scenario wherein two segments (New Segment and Active Segment) intersect the Active Y at the same point.

FIGS. 10A and 10B illustrate a scenario that is addressed in the last two statements of the Is Eastern Than algorithm. In this scenario, a comparison is made between two different segments that intersect the horizontal line of Active Y on the same point. To overcome or remedy this scenario, a temporary Active Y, notated as Active Y', is chosen. Active Y' must cross at least one of the segments (the Active Segment and the New Segment) and must be different than the Active Y. Then, a new comparison is made based on Active Y'.

FIG. 10B illustrates a scenario in which both segments (the Active Segment and the New Segment) are directed to the same direction. In this scenario, it does not matter which segment is chosen since either segment will suffice.

By contrast, FIG. 10A illustrates a scenario in which both segments (the Active Segment and the New Segment) are directed in opposite directions. In this scenario, the chosen segment is the one that "hides" the other from the eastern tile edge.

Figure 9:
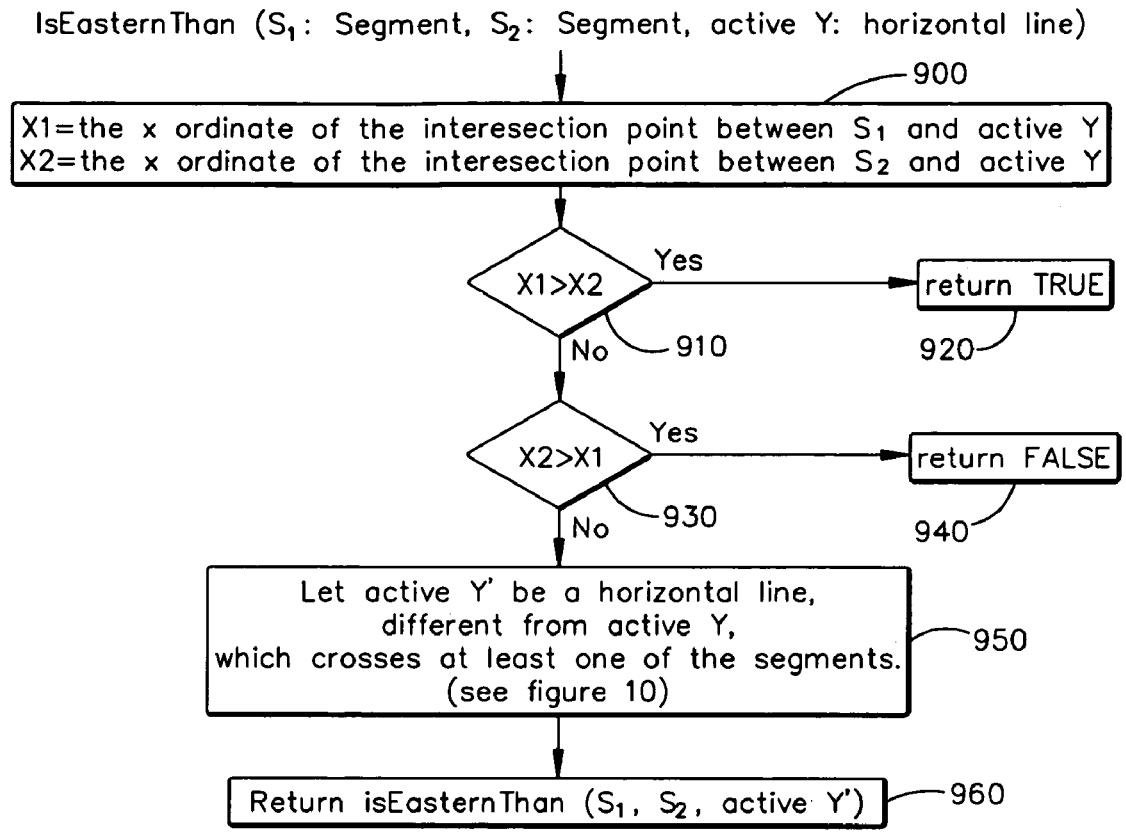
FIG. 9 is a flow diagram of embodiments in accordance with the invention.

The flow diagram of FIG. 9 discloses two segments (S1 and S2) with an Active Y horizontal line. Per block 900, X1 is designated as the x ordinate of the intersection point between S1 and the Active Y, and X2 is designated as the x ordinate of the intersection point between S2 and the Active Y.

Per block 910, a question is asked: Is X1 greater than X2? If the answer is "yes," then per block 920 return a "True." If the answer is "no," then per block 930 a question is asked: Is X2 greater than X1? If the answer is "yes," then per block 940 return a "False." If the answer is "no," then per block 950 establish the following: Let Active Y' be a horizontal line, different from Active Y, that crosses at least one of the segments. The scenario of block 950 is illustrated in FIG. 10. Then per block 960 return Is Eastern Than (S1, S2, Active Y').

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A method for defining attributes of polygon border tiles, comprising:
   decomposing, a polygon into a plurality of segments;
   decomposing, the segments into a plurality of border tiles;
   designating a same single edge for each border tile;
   determining whether the single designated edge of each border tile crosses the polygon, is within the polygon, or is outside the polygon in order to determine a spatial relationship between the designated edge of each border tile and the polygon;
   generating the attributes of the border tiles based on whether only the single designated edge of each border tile crosses the polygon, is within the polygon, or is outside the polygon; and
   storing the attributes to facilitate execution of queries.

2. The method of claim 1 wherein generating the attributes further comprises:
   generating a first attribute if the single designated edge of the border tile crosses the polygon;
   generating a second attribute if the single designated edge of the border tile is disposed completely within the polygon; and
   generating a third attribute if the single designated edge of the border tile is disposed completely outside the polygon.

3. The method of claim 2 wherein the first, second, and third attributes are different from each other.

4. The method of claim 1 wherein designating a same single edge for each border tile further comprises designating an eastern edge for each border tile.

5. The method of claim 1 wherein designating a same single edge for each border tile further comprises a same single edge selected from the group consisting of an eastern edge, a western edge, a northern edge, or a southern edge.

6. The method of claim 1 wherein the determining element further comprises determining if the single designated edge of a border tile is within an interior space of the polygon.

7. The method of claim 1 further comprising:
   designating the segments as vectors that traverse in a clockwise direction around a border of the polygon;
   determining an attribute of a border tile based on a proximity of one of the vectors to one of the edges of a border tile and based on a direction of the one of the vectors through the border tile.

8. The method of claim 1 further comprising decomposing multiple segments through a single border tile.

9. A computer-readable medium having computer-readable program code embodied therein for causing a computer system to perform:
   defining a polygon having a border that is non-self-intersecting and formed of a plurality of segments on grid of tiles;
   defining, from the grid of tiles, a plurality of border tiles that intersect the segments;
   generating an attribute associated with a same single edge for each of the plurality of border tiles, wherein the attribute is based on whether only the same single edge of each border tile crosses the polygon, is within the polygon, or is outside the polygon; and
   building an index or spatial objects with the attribute.

10. The computer-readable medium of claim 9 wherein the attribute can be modified on at least two different occasions for the same border tile.

11. The computer-readable medium of claim 9 wherein the attribute is set to a first condition and then re-evaluated and set to a second condition if multiple segments pass through the same border tile.

12. The computer-readable medium of claim 9 wherein the attribute is associated with an eastern edge of the border tile.

13. The computer-readable medium of claim 9 having computer-readable program code embodied therein for causing the computer system to further perform converting the polygon to a non-self-intersecting chain-code wherein at least one segment passes twice through the same border tile.

14. The computer-readable medium of claim 9 having computer-readable program code embodied therein for causing the computer system to further perform:
   defining a y-axis through a border tile;
   generating an attribute based on a proximity of a segment through the y-axis.

15. The computer-readable medium of claim 14 wherein generating an attribute further comprises comparing proximities of two different segments through the y-axis.

16. A computer system comprising:
   a processor; and
   memory having computer readable code executable by the processor for;
   decomposing a polygon into plural segments on a grid of tiles;
   identifying a same single edge for each of plural border tiles, each of the border tiles intersecting at least one of the segments;
   identifying spatial relationship between each of the single edges and the polygon to define an attribute of the plural border tiles with respect to the polygon, the attribute being based on whether only the single edge of each border tile is one of crossing the polygon, being within the polygon, and being outside the polygon and
   a display for displaying query results for the attribute of the polygon.

17. The computer system of claim 16 wherein the plural segments are non-self-intersecting.

18. The computer system of claim 16 further comprising computer readable code executable by the processor for identifying a spatial relationship between a direction of at least one segment though one of the border tiles to define an attribute of the one of the border tiles.

19. The computer system of claim 16 further comprising computer readable code executable by the processor for defining a horizontal axis through one of the border tiles and identifying a spatial relationship between at least one segment and the horizontal axis to define an attribute.

20. The method of claim 19 wherein the at least one segment crosses the horizontal axis to generate a first attribute and does not cross the horizontal axis to generate a second attribute different than the first attribute.

* * * * *

UNITED STATES PATENT AND TRADEMARK OFFICE
CERTIFICATE OF CORRECTION

PATENT NO. : 7,265,760 B2  Page 1 of 1
APPLICATION NO. : 10/809261
DATED : September 4, 2007
INVENTOR(S) : Tal Drory et al.

It is certified that error appears in the above-identified patent and that said Letters Patent is hereby corrected as shown below:

In column 9, line 6, in Claim 1, after "decomposing" delete ",".

In column 9, line 7, in Claim 1, after "decomposing" delete ",".

In column 9, line 35, in Claim 5, after "comprises" insert -- designating --.

In column 9, line 56, in Claim 9, insert -- a -- before "grid".

In column 10, line 1, in Claim 9, delete "or" and insert -- for --, therefor.

In column 10, line 37, in Claim 16, after "identifying" insert -- a --.

In column 10, lines 43-44, in Claim 16, after "display" delete "for displaying query results for the attribute of the polygon".

Signed and Sealed this

Fifth Day of May, 2009

JOHN DOLL
*Acting Director of the United States Patent and Trademark Office*